(No Model.)

J. E. GUENTHER.
FRUIT OR WINE PRESS.

No. 591,131. Patented Oct. 5, 1897.

WITNESSES:
Daniel B. Kehler
Sophia L. Schwarze

John E. Guenther INVENTOR

BY Chapin & Denny
his ATTORNEYS

UNITED STATES PATENT OFFICE.

JOHN E. GUENTHER, OF FORT WAYNE, INDIANA.

FRUIT OR WINE PRESS.

SPECIFICATION forming part of Letters Patent No. 591,131, dated October 5, 1897.

Application filed December 14, 1896. Serial No. 615,572. (No model.)

*To all whom it may concern:*

Be it known that I, JOHN E. GUENTHER, a citizen of the United States, residing at Fort Wayne, in the county of Allen, in the State of Indiana, have invented certain new and useful Improvements in Fruit or Wine Presses; and I do hereby declare that the following is a full, clear, and exact description of the invention, which will enable others skilled in the art to which it appertains to make and use the same, reference being had to the accompanying drawings, which form part of this specification.

My invention relates to improvements in fruit and wine presses specially adapted for household use.

The object of my invention is to provide a simple, cheap, and efficient fruit and wine press having detachable crushing-rollers rotatably mounted in a containing-receptacle and adapted for automatically discharging the pomace and other refuse while in operation to avoid the intermingling of the said refuse and the expressed juices and also to avoid the necessity of stopping the machine when in operation for the removal of the said refuse.

Another object is to provide a fruit-press specially adapted for household use in expressing in limited quantities the juice of fruits for wines, cider, jellies, &c., adapted to be operated by hand or other motive power.

My invention comprises an ellipsoidal body having a perforated sheet-metal bottom or partition embracing the crushing-rollers; a pair of crushing-rollers operatively connected by a pair of meshing gear-wheels and rotatably mounted in said body and within said partition and having a series of spiral peripheral ribs adapted to make the said cylinders self-discharging longitudinally for the seeds, stems, skins, and other refuse, and a chamber adapted to receive the juices from the said rollers through the said partition.

The novel feature of my invention consists in the construction and arrangement of the ribbed detachable and self-discharging crushing-rollers and the means for separating and discharging the juices therefrom without loss by intermingling with the refuse.

Similar reference-numerals indicate similar parts throughout the several views, in which—

Figure 1:
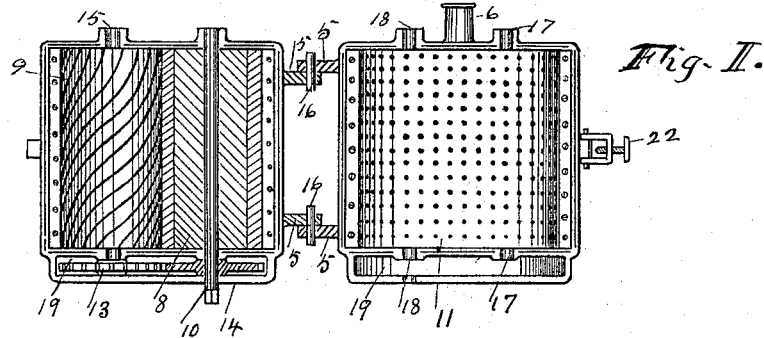
Figures 2, 3:
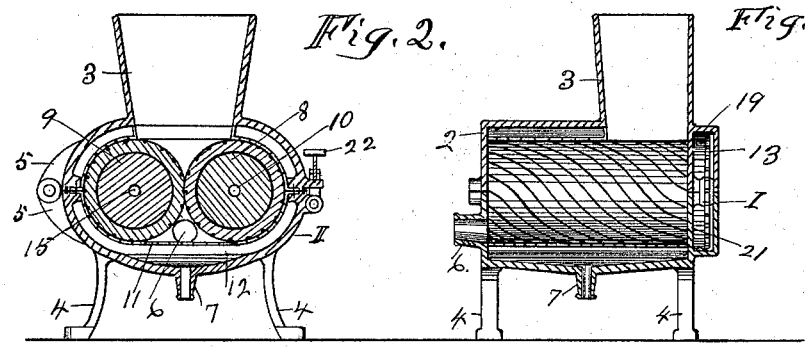
Figures 4, 5:
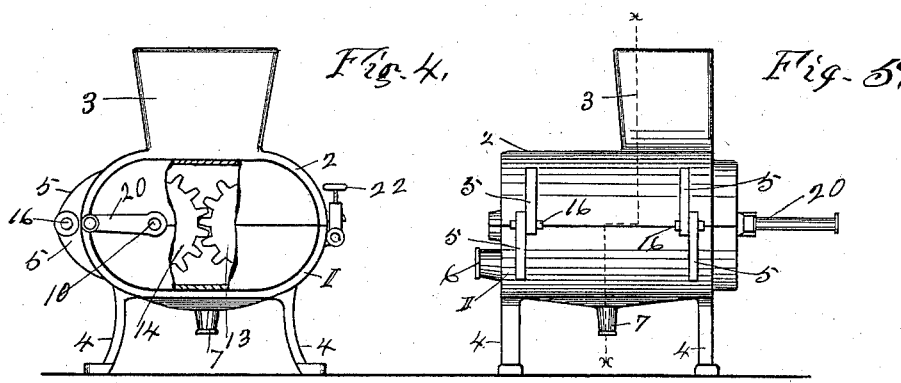

Figure 1 is a plan of my invention with the lid thereof thrown back to show the perforated sheet-metal partition, the crushing-rollers and actuating-gears therefor being arranged in said lid and one of said rollers being shown in longitudinal central section. Fig. 2 is a transverse section of my improvement, taken on the broken line $x\ x$ of Fig. 5. Fig. 3 is a longitudinal central section of the same, showing how the spiral peripheral ribs are adapted to conduct the refuse to the discharge-opening. Fig. 4 is an end view of the same, showing the operating-handle, and also broken away to show the meshing gear-wheels by which the second roller is actuated. Fig. 5 is a side view of the same.

The ellipsoidal body 1, of any desired size and of any proper material, preferably of bent wood, has a fixed or integral upright open-topped hopper 3, arranged at one end thereof and midway the sides thereof, Figs. 3 and 4, by which the fruit is supplied to the crushing-rollers, and has a semiellipsoidal lid 2, mounted on said body by the hinges 5, pivotally connected by the pivot-pins 16, and can be rigidly secured in place by any proper latch 22. The forward end of the said body and lid has a narrow chamber 19, Fig. 3, separated from the main portion of the interior by the transverse partition 21, adapted to securely inclose and protect the operating gear-wheels. In suitable bearings 17 and 18 in body 1 and in the said partition 21 the longitudinal shafts 15 and 10 are rotatably mounted, respectively, the said lid 2 having coincident bearings for the upper portion of said shafts. On these shafts 10 and 15 the crushing-rollers 8 and 9 are concentrically fixed. The shaft 10 is extended outwardly at the forward end thereof and provided with a fixed crank-handle 20 for operating the same. The forward ends of the said shafts 10 and 15 are also provided with the respective rigid meshing gear-wheels 14 and 13, arranged in the said chamber 19. The crushing-rollers 8 and 9 are in all respects identical in construction, the main portion thereof being preferably formed of wood and the perimeter being formed of vulcanized rubber and provided with a series of spiral peripheral ribs so arranged that the ribs of one cylinder or roller will be received by the corresponding intervening space of the other cylinder, the said ribs being so arranged as to automatically discharge the refuse longitudinally and at the rear end of the machine, as seen in Fig. 3. The perforated metallic bottom 11 or partition is in two sections, the lower section being rigidly fixed in said body 1, Figs. 1 and 2, and the upper coincident section being secured to the lower edge of the hinged lid and also to the lower end of the hopper. As seen in Fig. 2, a space or chamber is formed between the crushing-rollers and the said partition 11. This space or chamber is provided with a discharge spout or opening 6 at the rear end of the machine, as seen in Fig. 3. Between the bottom of said perforated partition 11 and the bottom of said body 1 is a space or chamber 12, adapted to receive the juices as they drip or enter the said partition 11 from the said rollers. This chamber has a vertical discharge-opening 7 for the expressed juices. My improved fruit-press thus constructed has any proper supporting-legs 4 and is operated substantially as follows: It is obvious that as the roller 8 and the actuating gear-wheel 14 are both fixed upon the shaft 10 and the roller 9 and the meshing gear-wheel 13 are both fixed on the shaft 15 rotating the roller 8 in the direction of its companion roller by means of the said crank-handle will rotate the roller 9 in the opposite direction or toward its companion, so that when the fruit is fed in at the hopper it will pass between the said rollers and the juice will be expressed therefrom and will find its way onto and through the said perforated partition 11 into the said chamber 12, from whence it passes outward into a proper receptacle through the discharge-opening 7. The skins, stems, seeds, and other refuse do not pass downward between the rollers into the said chamber 12 until they reach the opening 6, through which they are discharged continuously when the machine is in operation, being thus carried toward the said opening by the said spiral peripheral ribs. The said crushing-rollers are thus self-discharging, and as the refuse and the expressed juices are at no stage of the process intermixed, but are simultaneously discharged, as described, less juice is wasted and absorbed than by the usual process and no time is lost in removing the refuse. The rubber perimeter of said rollers may be vulcanized as hard as desired—as, for example, the rubber perimeter should be much harder and more firm for crushing apples than for crushing grapes. In the latter case the rubber should be sufficiently flexible and yielding to express the juice of the grape-berry without crushing the seeds thereof and thereby preserve the full flavor of the must. As the said rollers are loosely mounted in their said bearings they can readily be removed for cleaning or repairs by throwing back the lid 2. My invention is thus specially adapted for household use.

Having thus described my invention and the manner of employing the same, what I desire to secure by Letters Patent is—

1. In a wine or fruit press, the combination of an ellipsoidal body having proper supporting-legs, a horizontal discharge-opening for the refuse arranged as shown, a vertical discharge-opening for the expressed juices, and a cylindrical perforated sheet-metal partition embracing the crushing-rollers, and provided with a removable lid 2 having a feeding-hopper 3; the longitudinal shafts 10 and 15 rotatably mounted in said body; a pair of adjacent crushing-rollers rigidly fixed on said shafts, the said rollers having a vulcanized-rubber periphery provided with a series of spiral ribs arranged as shown and adapted to be self-discharging, as described; a pair of meshing gear-wheels fixed on said shafts for the purpose specified and means for actuating said shaft 10, all substantially as described.

2. The combination, in a fruit-press of a chambered press-body having a hinged lid therefor provided with a vertical hopper, the said body having a discharge-opening at the rear end of the crushing-rollers, and a perforated partition embracing said rollers, and so arranged therein as to form a receptacle-chamber 12 for the expressed juices; a pair of adjacent crushing-rollers revolubly mounted in said body, having a periphery of hard rubber provided with spiral ribs adapted to express the juices without crushing the seeds, the said ribs being so arranged as to make the said rollers self-discharging longitudinally; and means for actuating the said rollers, all substantially as described.

3. The combination of the press-body 1 having a hinged lid 2, and a two-part perforated partition 11 separating the crushing-rollers from the juice-chamber; the longitudinal shafts 10 and 15 revolubly mounted in said body; the crushing-rollers 8 and 9 fixed on said shafts respectively, and provided with flexible coincident spiral peripheral ribs for the purpose specified, and so arranged as to be self-discharging as described; the meshing gear-wheels 14 and 13 fixed on said shafts for the purpose specified; and the actuating crank-handle 20 fixed on the outer extended end of the shaft 11 as shown, all substantially as and for the purpose specified.

Signed by me, at Fort Wayne, Allen county, State of Indiana, this 8th day of December, A. D. 1896.

JOHN E. GUENTHER.

Witnesses:
FRANK MILLER,
IDA L. ROSS-LEWIN.